(12) United States Patent
Orioku

(10) Patent No.: US 11,105,391 B2
(45) Date of Patent: Aug. 31, 2021

(54) DYNAMIC DAMPER

(71) Applicant: NOK CORPORATION, Tokyo (JP)

(72) Inventor: Yutaka Orioku, Tottori (JP)

(73) Assignee: NOK CORPORATION

( * ) Notice: Subject to any disclaimer, the term of this patent is extended or adjusted under 35 U.S.C. 154(b) by 223 days.

(21) Appl. No.: 16/483,183

(22) PCT Filed: Oct. 12, 2017

(86) PCT No.: PCT/JP2017/036917
§ 371 (c)(1),
(2) Date: Aug. 2, 2019

(87) PCT Pub. No.: WO2018/088103
PCT Pub. Date: May 17, 2018

(65) Prior Publication Data
US 2020/0232536 A1 Jul. 23, 2020

(30) Foreign Application Priority Data
Nov. 8, 2016 (JP) .............................. JP2016-218112

(51) Int. Cl.
*F16F 15/126* (2006.01)
*F16F 15/14* (2006.01)
(Continued)

(52) U.S. Cl.
CPC ........ *F16F 15/126* (2013.01); *F16F 15/1442* (2013.01); *B60K 17/22* (2013.01);
(Continued)

(58) Field of Classification Search
CPC ...... F16F 15/126; F16F 15/1442; F16F 15/08; F16F 13/14; F16F 2228/04; F16F 2055/366; B60K 17/22; B60K 17/24
(Continued)

(56) References Cited

U.S. PATENT DOCUMENTS 3,639,015 A * 2/1972 Maas ................... F16C 27/066
384/536
6,869,225 B2 3/2005 Tatsumura
(Continued)

FOREIGN PATENT DOCUMENTS

JP H2253028 A 10/1990
JP H1172143 A 3/1999
(Continued)

*Primary Examiner* — Thomas W Irvin
(74) *Attorney, Agent, or Firm* — Harness, Dickey & Pierce, P.L.C.

(57) ABSTRACT

A dynamic damper includes a hub, a vibration ring located on the outer periphery of the hub, and a pair of elastic bodies made of a rubber-like elastic body located on both sides in the axial direction of the vibration ring and coupling the hub and the vibration ring, in which the vibration ring is provided with a protrusion extending to the vicinity of the outer periphery of the hub, each of the elastic bodies has a shape of being curved outward in the axial direction from the protrusion from the hub to the vibration ring, a projection extending toward the protrusion is integrally molded on a surface on a protrusion side in the elastic bodies, and a gap is set between the protrusion and the projection.

2 Claims, 3 Drawing Sheets

(51) Int. Cl.
*B60K 17/22* (2006.01)
*F16F 15/08* (2006.01)
*F16H 55/36* (2006.01)

(52) U.S. Cl.
CPC ........... *F16F 15/08* (2013.01); *F16F 2228/04* (2013.01); *F16H 2055/366* (2013.01)

(58) Field of Classification Search
USPC ........................................ 267/140, 141, 293
See application file for complete search history.

(56) References Cited

U.S. PATENT DOCUMENTS

| | | | | |
|---|---|---|---|---|
| 7,866,639 B2* | 1/2011 | Endo | ...................... | F16F 13/14 |
| | | | | 267/140.12 |
| 7,946,925 B2* | 5/2011 | Kawakatsu | ......... | F16F 15/1442 |
| | | | | 464/180 |
| 8,136,646 B2* | 3/2012 | Kuwayama | ............. | F16F 7/108 |
| | | | | 188/379 |
| 8,591,117 B2* | 11/2013 | Giraud | .................... | F16F 13/14 |
| | | | | 384/536 |
| 9,328,772 B2* | 5/2016 | Ikeda | ....................... | F16C 35/04 |
| 10,590,983 B2* | 3/2020 | Durre | ...................... | F16C 33/20 |
| 2002/0131660 A1* | 9/2002 | Bade | ...................... | F16C 27/066 |
| | | | | 384/536 |
| 2003/0002760 A1 | 1/2003 | Tatsumura | | |
| 2006/0157903 A1* | 7/2006 | Hayashi | ............... | F16F 15/1442 |
| | | | | 267/293 |
| 2008/0095484 A1* | 4/2008 | Wirges | .................. | F16C 27/066 |
| | | | | 384/536 |

FOREIGN PATENT DOCUMENTS

| | | |
|---|---|---|
| JP | 2006105261 A | 4/2006 |
| WO | WO-0170535 A1 | 9/2001 |

* cited by examiner

DYNAMIC DAMPER

CROSS REFERENCE TO RELATED APPLICATIONS

This application is a U.S. National Phase application of International Application No. PCT/JP2017/036917, filed on Oct. 12, 2017 and published in Japanese as WO 2018/088103 on May 17, 2018 and claims priority to Japanese Patent Application No. 2016-218112, filed on Nov. 8, 2016. The entire disclosures of the above applications are expressly incorporated by reference herein.

BACKGROUND

Technical Field

The present invention relates to a damper and more specifically relates to a dynamic damper absorbing a torsional vibration generated in a rotational drive system, such as a propeller shaft, of an internal combustion engine. The dynamic damper is sometimes referred to as Tilger.

Related Art

A rear-wheel drive or four-wheel drive automobile is provided with a propeller shaft in order to transmit an output of an internal combustion engine mounted in the front of a vehicle to rear wheels. Herein, when a vibration occurs in the propeller shaft, the vibration is transmitted to the vehicle. Therefore, the vibration characteristic of the propeller shaft has great influence on the vibration of the vehicle.

Therefore, conventionally, the propeller shaft is mounted with a dynamic damper 510 provided with a hub 520, a vibration ring 530 located on the outer periphery of the hub 520, and an elastic body 540 made of a rubber-like elastic body coupling the hub 520 and the vibration ring 530 as illustrated in FIG. 3.

The vibration ring 530 and the elastic body 540 resonate so as to cancel the vibration in the rotation of the propeller shaft, whereby the dynamic damper 510 can damp the vibration in the torsional direction (rotation direction).

Herein, the frequency band of the vibration generated in the propeller shaft has become low by the weight reduction of vehicles aiming at an improvement of fuel consumption in recent years. When the frequency of the vibration decreases, a vibration input value to the dynamic damper 510 tends to increase, so that there is a possibility that a high torsional load is applied to the elastic body 540.

To address the problem, it is considered to increase the durability of the elastic body 540 by lengthening the elastic body 540 in the radial direction. However, space in the radial direction where the elastic body 540 is provided also needs to be enlarged.

Moreover, it is also considered to provide a stopper regulating the relative displacement of the vibration ring 530 in order to prevent a high torsional load from being applied to the elastic body 540, which is not preferable because the number of components increases.

The present invention has been made in view of the above-described points. It is a technical problem to be solved of the present invention to provide a dynamic damper capable of reducing a torsional load on an elastic body by setting the length in the radial direction of the elastic body to be long without increasing space in the radial direction where the elastic body is provided and regulating the relative displacement of a vibration ring.

SUMMARY

As a means for effectively solving the technical problem to be solved described above, a dynamic damper of the present invention is provided with a hub, a vibration ring located on the outer periphery of the hub, and a pair of elastic bodies made of a rubber-like elastic body located on both sides in the axial direction of the vibration ring and coupling the hub and the vibration ring, in which the vibration ring is provided with a protrusion extending to the vicinity of the outer periphery of the hub, each of the elastic bodies has a shape of being curved outward in the axial direction from the protrusion from the hub to the vibration ring, a projection made of a rubber-like elastic body extending toward the protrusion is integrally molded on a surface on protrusion side in the elastic bodies, and a gap is set between the protrusion and the projection.

In the elastic body, a rubber block increasing the thickness of the elastic body is formed in a part thereof.

Effect of the Invention

According to the dynamic damper of the present invention, the torsional load on the elastic bodies can be reduced without increasing the space in the radial direction where the elastic bodies are provided by forming the elastic bodies into the curved shape, the relative displacement of the vibration ring can be damped by the resistance when the projection contacts the protrusion, and a function as a stopper can also be exhibited.

DETAILED DESCRIPTION

Next, a dynamic damper 10 according to this embodiment is described in detail based on the drawings.

Figure 1:
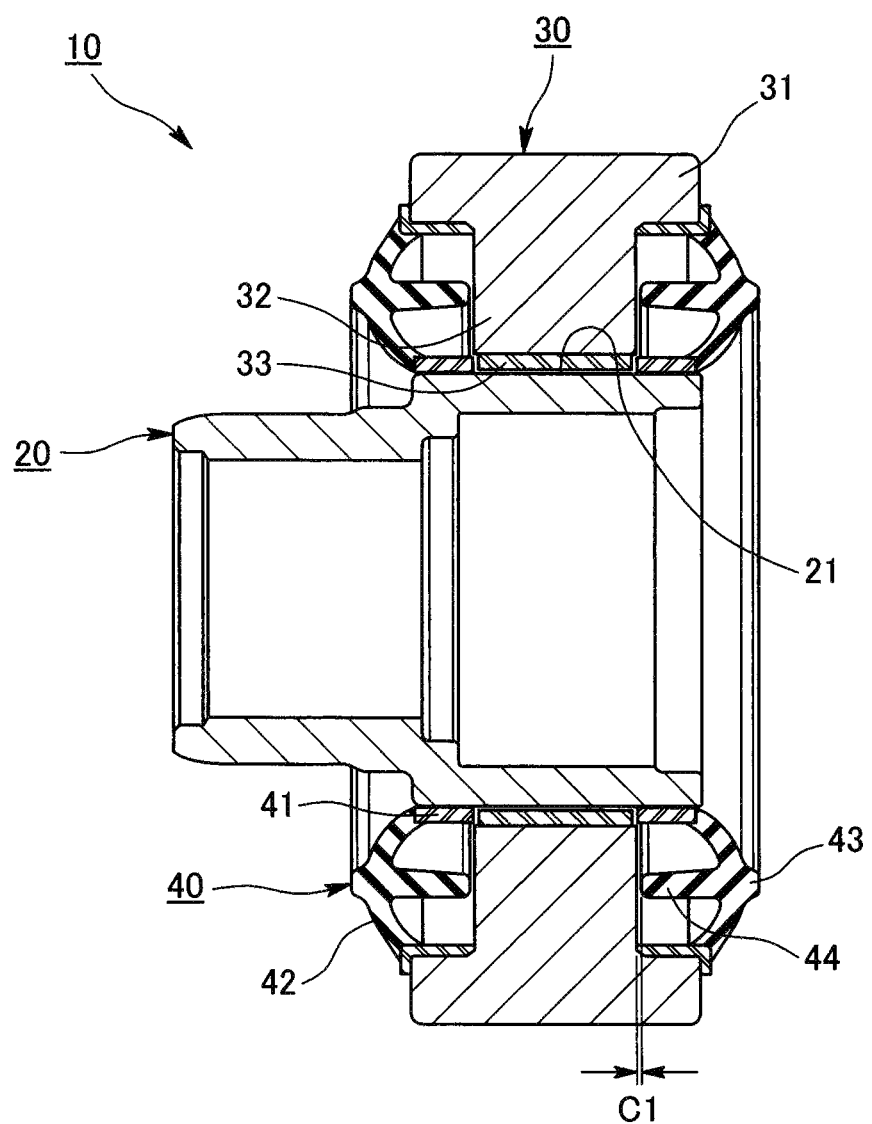
FIG. 1 is a cross-sectional view illustrating a dynamic damper according to an embodiment of the present invention.
Figure 2:
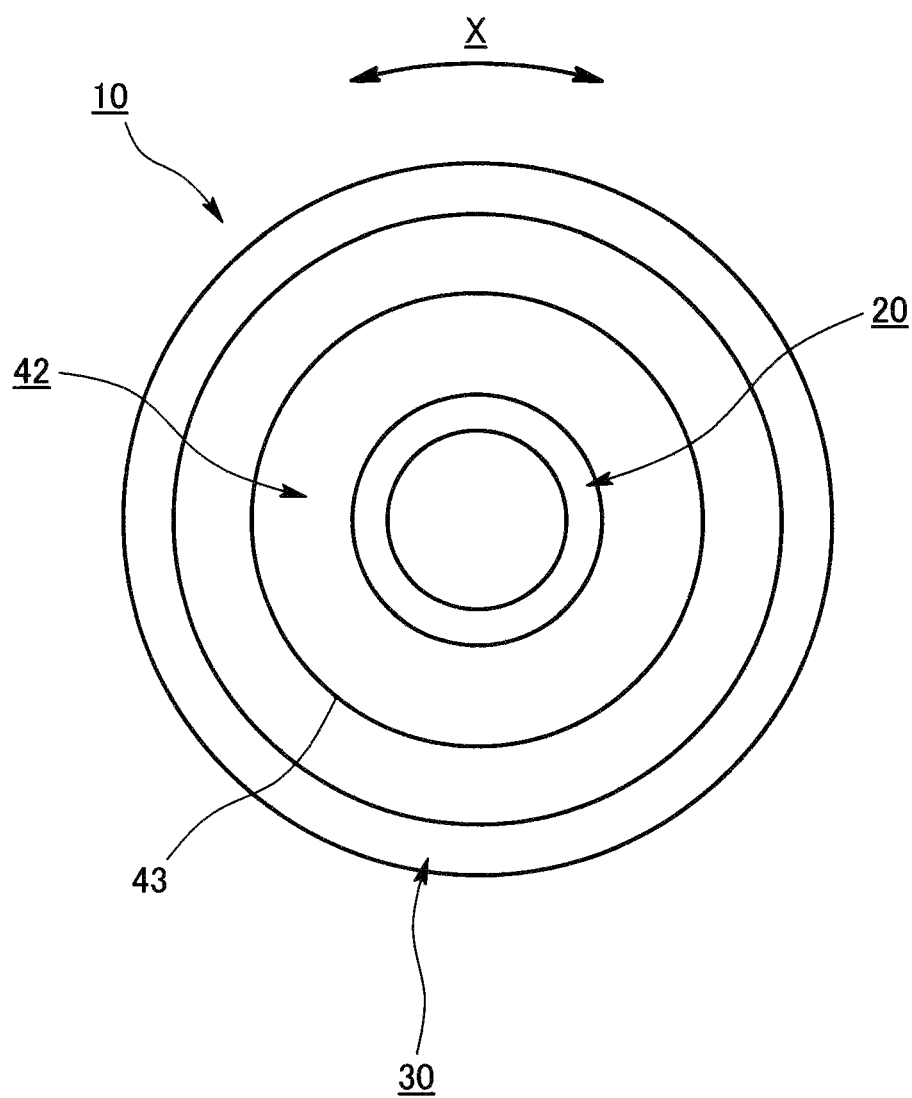
FIG. 2 is a plan view illustrating the dynamic damper according to the embodiment of the present invention.
Figure 3:
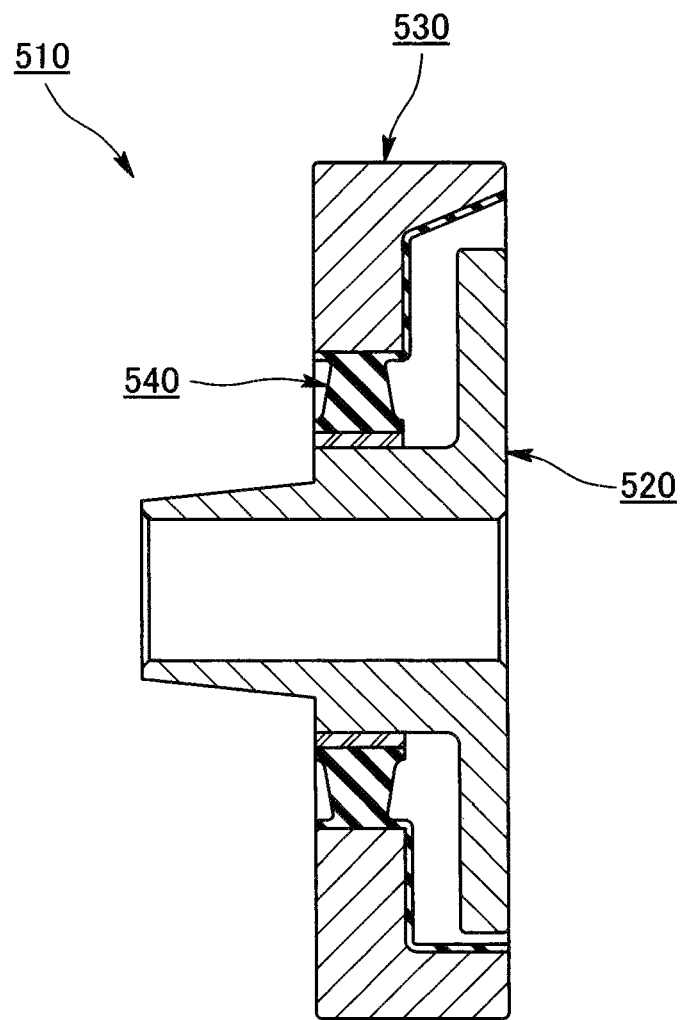
FIG. 3 is a cross-sectional view illustrating a dynamic damper according to a conventional technique.

As illustrated in FIG. 1 and FIG. 2, the dynamic damper 10 according to the embodiment is provided with a cylindrical hub 20, a cylindrical vibration ring 30 located on the outer periphery of the hub 20, and a pair of elastic bodies 40 located on both sides in the axial direction of the vibration ring 30 and coupling the hub 20 and the vibration ring 30. The dynamic damper 10 is mounted to a propeller shaft located below a vehicle, such as an automobile.

The hub 20 is fixed to the propeller shaft and an outer peripheral surface 21 thereof is coupled to the vibration ring 30 through the elastic bodies 40.

The vibration ring 30 has an annular vibration ring body 31 coupled to the outer periphery of the hub 20 through a sleeve 41 and the elastic bodies 40. A protrusion 32 is formed toward the inner diameter direction from the center in the axial direction of the vibration ring body 31. In the protrusion 32, a dry bearing 33 is fitted to the inner peripheral surface thereof. A very small gap is set between the inner peripheral surface of the dry bearing 33 and the outer peripheral surface 21 of the hub 20.

Each of the elastic bodies 40 is made of an annular rubber-like elastic body and is provided with a curved portion 42 having a shape of being curved outward in the axial direction (horizontal direction in FIG. 1) from the protrusion 32 in the vibration ring 30, an annular rubber block 43 formed on the outer surface in the center (peak of the curved portion 42) of the curved portion 42, and an annular projection 44 formed on the inner surface in the center of the curved portion 42.

Both ends in the radial direction of the curved portion 42 are coupled to the vibration ring 30 and the hub 20 through a sleeve 41. The curved portion 42 can be elastically deformed when the vibration ring 30 is displaced in a torsional direction X with respect to the hub 20.

The rubber block 43 is formed on the outer surface in the center of the curved portion 42. A part of the curved portion 42 where the rubber block 43 is located becomes thick and the rigidity of a portion of the rubber block 43 in each of the elastic bodies 40 increase.

The projection 44 extends in the axial direction from the inner surface in the center of the curved portion 42 toward the protrusion 32. A very small gap C1 is provided between the tip of the projection 44 and the protrusion 32. The gap C1 is set to be approximately 1 to 2 mm.

According to the dynamic damper 10 having the above-described configuration, the elastic bodies 40 and the vibration ring 30 resonate with a phase opposite to the phase of the displacement in the torsional direction X by the vibration of the propeller shaft, and therefore the vibration of the propeller shaft can be reduced.

Moreover, even when muddy water of the road surface and the like fly to the propeller shaft located below the vehicle, both ends of the curved portions 42 are fitted to the vibration ring 30 and the hub 20, and therefore the muddy water and the like do not enter the dynamic damper 10.

Moreover, when the vibration ring 30 in the dynamic damper 10 is displaced in the torsional direction X with respect to the hub 20 by the vibration accompanying the rotation of the propeller shaft, the curved portions 42 in the elastic bodies 40 are pulled in the torsional direction X. At this time, the rigidity of the rubber blocks 43 in the elastic bodies 40 increases by the rubber blocks 43 formed on the outer surfaces in the center of the curved portions 42.

Moreover, when the vibration ring 30 is twisted by a certain degree or more with an increase in the number of rotations of the propeller shaft, the curved portions 42 are pulled. Thus, the gap C1 between the projection 44 and the protrusion 32 decreases, so that the projections 44 contact the protrusion 32, whereby the damping amount of the vibration in the torsional direction X can be increased.

As described above, according to the dynamic damper 10 of this embodiment, the curved portions 42 having the curved shape are pulled in the torsional direction X when the vibration ring 30 is displaced in the torsional direction X with respect to the hub 20, and therefore the length in the radial direction of the elastic bodies 40 is longer than that of the dynamic damper 510 according to the conventional technique, whereby the displacement tolerance increases.

Therefore, the torsional durability against the relative displacement of the vibration ring 30 is improved, the range of the vibration reduction effect to the rotation of the propeller shaft can be increased, and the space in the radial direction where the elastic bodies 40 are provided in the dynamic damper 10 is not required to be enlarged.

Moreover, according to the dynamic damper 10 of this embodiment, the projections 44 can increase the damping amount of the vibration in the torsional direction X with respect to the vibration ring 30 when the vibration ring 30 is twisted by a certain degree or more. Therefore, the damping amount to the vibration of the propeller shaft can be increased as compared with that in the dynamic damper 510 according to the conventional technique. As a result, the projections 44 can exhibit a stopper function to prevent the vibration ring 30 from being twisted by a certain degree or more.

Moreover, according to the dynamic damper 10 of this embodiment, the rigidity in the rubber blocks 43 provided in parts of the elastic bodies 40 increases and the outer diameter side and the internal diameter side can be elastically deformed with good balance with the rubber blocks 43 as the center. Therefore, stress can be prevented from concentrating on parts of the elastic bodies 40.

In the present invention, the positions where the rubber blocks are molded in the elastic bodies are not particularly limited. However, in order for the outer diameter side and the internal diameter side to be elastically deformed with good balance, it is preferable that the rubber blocks are formed in the center of the elastic bodies, i.e., around the peaks of the curved portions.

The invention claimed is:

1. A dynamic damper comprising:
   a hub;
   a vibration ring located on an outer periphery of the hub; and
   a pair of elastic bodies located on both sides in an axial direction of the vibration ring and coupling the hub to the vibration ring, wherein
   the vibration ring is provided with a protrusion extending proximate the outer periphery of the hub,
   each of the elastic bodies includes a curved portion that extends outward in the axial direction away from the protrusion from the hub to the vibration ring,
   an elastic projection extending toward the protrusion is integrally molded on a surface on a protrusion side of each of the pair of elastic bodies,
   each of the elastic bodies includes a rubber block that increases a thickness of the curved portion of the elastic body at a location opposite to the elastic projection, and
   a gap is provided between each axial side of the protrusion and each elastic projection.

2. The dynamic damper according to claim 1, wherein each of the elastic bodies includes a first end attached to the hub and a second opposite end attached to the vibration ring, and each of the elastic projection and the rubber block are attached to the curved portion at a midpoint between the first and second ends.

* * * * *